United States Patent [19]
Dixon

[11] Patent Number: 5,619,517
[45] Date of Patent: Apr. 8, 1997

[54] OPTICAL PARAMETRIC OSCILLATOR WITH BUILT-IN SEEDING LASER SOURCE

[75] Inventor: George J. Dixon, Indian Harbor Beach, Fla.

[73] Assignee: Research Foundation of the University of Central Florida, Orlando, Fla.

[21] Appl. No.: 382,085

[22] Filed: Feb. 1, 1995

[51] Int. Cl.[6] ........................................ H01S 3/10
[52] U.S. Cl. .................. 372/21; 372/69; 372/92; 372/20; 372/19; 372/93; 359/328
[58] Field of Search ................... 372/21, 26, 92, 372/69, 19, 20, 93; 359/328

[56] References Cited

U.S. PATENT DOCUMENTS

| | | | |
|---|---|---|---|
| 4,807,204 | 2/1989 | Goldstone | 372/69 |
| 4,884,276 | 11/1989 | Dixon et al. | 372/21 |
| 4,914,663 | 4/1990 | Basu et al. | 372/97 |
| 5,130,997 | 7/1992 | Ortiz et al. | 372/21 |
| 5,195,104 | 3/1993 | Geiger et al. | 372/21 |
| 5,291,503 | 3/1994 | Geiger et al. | 372/22 |
| 5,341,236 | 8/1994 | Stappaerts | 372/22 |
| 5,390,211 | 2/1995 | Clark et al. | 372/95 |
| 5,406,409 | 4/1995 | Harlamoff et al. | 372/21 |

OTHER PUBLICATIONS

Dzhotyan et al, "Singly resonant optical parametric oscillator with external signal injection", Sov. J. Quantun Electron. 20(12), Dec./1990.

*Primary Examiner*—Leon Scott, Jr.
*Attorney, Agent, or Firm*—Leydig, Voit & Mayer, Ltd.

[57] ABSTRACT

An apparatus and method for energy conversion of laser light with optical paramedic oscillation with reduced threshold and improved efficiency. A laser and an optical parametric oscillator are combined so that they share the same optical cavity. The laser field in the cavity is used as the seeding wave for the optical nonlinear material in converting the input pump wave into signal and idler waves, the idler wave having a frequency substantially identical to the laser frequency.

12 Claims, 1 Drawing Sheet

OPTICAL PARAMETRIC OSCILLATOR WITH BUILT-IN SEEDING LASER SOURCE

FIELD OF THE INVENTION

This invention relates generally to optical parametric oscillators in laser applications, and more particularly to laser pumped optical parametric oscillators for frequency conversion.

BACKGROUND OF THE INVENTION optical parametric oscillators (OPO) are important devices for producing tunable coherent radiation by converting light from a pump source to light at longer wavelengths. The light conversion process can be thought of as the decomposition of a photon into two less energetic photons. In an optical parametric oscillator (OPO), which is a combination of a piece of nonlinear optical material and an optical cavity, a pump beam at frequency $\omega_1$ produces the gain at the signal and idler frequencies, $\omega_2$ and $\omega_3$, where $\omega_1=(\omega_2+\omega_3)$. In order to produce optical parametric oscillation, the power of the pump wave has to be above a certain threshold power. Efficient operation of a OPO for frequency conversion may require pump power much higher than the threshold.

During the late sixties and early seventies, a number of laboratories attempted to develop broadly-tunable pulsed OPO's. Their attempts were frustrated by the limitations of materials available then. The available nonlinear crystals at that time include lithium niobate, proustite, and many others. Those nonlinear optical materials have low damage thresholds, and were often destroyed at pump power levels below those needed to efficiently pump the OPO.

In the last few years, there has been a resurgence of interest in optical parametric oscillators resulting from the development of new nonlinear crystals, such as KTP, BBO, and LBO, that combine high damage thresholds and high nonlinear coefficients. Optical parametric oscillators using those new materials are currently being developed in a number of laboratories in the U.S. and abroad. Some degree of success has been achieved in using those materials for the generation of tunable light. For example, Kato and Masutani, in "Widely Tunable 90° Phase Matched KTP Parametric Oscillator," Optical Letters,17, 178 (1992), have reported a pulse-pumped, non-critically phase matched, KTP oscillator that could be tuned over a broad spectral range by varying the wavelength of the pump between 0.7 um and 0.95 um.

Even though the development in material science provided some new nonlinear materials for OPO applications, it would still be desirable to provide a means to use the nonlinear crystals from the 1960's and 1970's in OPO applications without damaging the crystals by the pump source. The pump energy required for OPO's currently available is also somewhat high. As reported by Kato and Masutani, the threshold for their OPO when pumped at 0.865 um with 10 nsec pulse length was approximately 0.7 J/cm2, which corresponded to an incident pump energy of 22 mJ. A pump energy depletion of 30% was observed at an incident pump energy of 70 mJ. Although this kind of pump power can be obtained with a flashlamp-pumped laser as the pump source, it is too high to reach easily with a diode-pumped solid state laser. If pulses shorter than 10 nsec are used to pump the OPO, the threshold will be even higher, and higher pump energy will be required to achieve the same efficiency of conversion.

The threshold pump requirement of an OPO with a pulsed pump is higher than the threshold of the same OPO pumped with a CW source. In the prior art when the set up involves only pumping an OPO to get an output, the gain of an OPO is only present for the duration of the pump pulse. The threshold in such a device is determined partially by intra-cavity losses and output coupling (which completely determines the CW threshold), the length of the pump pulse, and the time needed for the OPO field to build from noise. If the device is pumped with short pulses, e.g. pulses shorter than 10 nsec, and in many cases even shorter than 1 nsec, the threshold power required by the OPO from a pulses pump source could be several times that for a CW pump. This corresponds to the case where the OPO just starts to operate when the pump pulse is already ending. In order for the OPO to operate efficiently, it is necessary to shorten the build up time further by increasing the pump energy. For these reasons, prior art pulse-pumped OPO's must be pumped several times (between 5 and 10) above the threshold in order to extract energy from the pump pulses.

One method which has been used in the prior art to reduce the threshold of OPO's pumped by a pulsed pump source is "injection seeding." A source of a "seeding wave," which has a wavelength generally coinciding with the wavelength of either the signal or idler waves generated by the OPO, is injected into the OPO cavity. Injection seeding has two effects on the OPO. First, it can be used to force single mode operation of the OPO in much the same way as injection seeding can force single-frequency operation of a Q-switched solid state laser. If the injected power significantly exceeds the spontaneous emission into a cavity mode, oscillation will build up on the longitudinal mode that is closest in frequency to the seed source. The amount of power needed to seed a particular mode depends on the frequency difference between the seed source and a longitudinal mode of the OPO.

The second effect of injection seeding an OPO is to shorten the pulse buildup time. Due to the existence of the seeding wave, the OPO field in the cavity does not have to build up from noise. This has the effect of decreasing the threshold power and increasing the efficiency of the OPO for a pulsed pump.

The effectiveness of injection seeding depends on the intensity of the seeding wave in the cavity. If a weaker seed source is used, the efficiency and threshold advantages gained by seeding decrease significantly. The effect of injection seeding a pulsed optical parametric oscillator has been considered by a number of authors, such as A. G. Marunkov, V. I. Pryalkin and A. I. Kholoknykh, "Improvement in the Conversion Efficiency of Pulsed Optical Parametric Oscillators Using External Signal Injection," Sov. Journal of Quantum Electron. 17, 392 (1987). It has been shown that injected seeding powers of 1 watt or more can have a dramatic effect on the efficiency and threshold of a pulse-pumped OPO. Seeding power level of such magnitude can be obtained by using a Q-switched source.

Use of a pulsed seed source, however, can be difficult because it requires careful timing of the injected seeding pulses relative to the pump pulses. Furthermore, the Q-switched seed source has to be of a single frequency, which is generally difficult to build.

There are other difficulties in using injection seeding to enhance the performance of an OPO. For efficient seeding, it is necessary to spatially and spectrally match the mode of the seeding wave to the OPO cavity. The frequency of the external source must be nearly resonant with the OPO cavity. This requirement often results in optomechanical complexity. It is also necessary to optically isolate the seed source from the OPO, because the power reflected from or generated by the OPO can destabilize the seed source, or even destroy it if the power from the OPO is large.

SUMMARY OF THE INVENTION

It is a global object of the present invention to provide a configuration of optical parametric oscillator for use as a tunable light source which has low threshold and high conversion efficiency when the pump wave is pulsed. To this end, it is an object to provide a means which has the advantage of injection seeding, but without the difficulties associated with the use of injection seed source.

It is a related object to reduce the power requirement of an injection seed source for effectively reducing the threshold and improving the efficiency of the OPO.

It is a further related object of the invention to reduce the optical components used for mode matching the seeding wave to the OPO cavity.

In accordance with these and other objects of the invention, there is provided an optical parametric oscillator which has a laser built into the same resonator as the OPO. The laser, which shares the same cavity with the nonlinear crystal, generates the seeding wave which coincides with one of the output waves of the OPO. This arrangement effectively removes the difficulty in finding a powerful external source for injection seeding, because the light intensity within a laser cavity can be many times greater than its output. The high intensity of the seeding wave in the cavity reduces the threshold of the OPO and improves its efficiency.

Many other difficulties involved in using an external seed source are also avoided. Since the laser cavity is also the OPO cavity, the seed and OPO modes are automatically matched. The difficulties encountered in mode matching an external injection seeding wave with the OPO is therefore completely avoided. Since an external seed source is not used, the need for optical components for mode matching an external seed source is also eliminated thus achieving economic efficiencies. The need for optically isolating the external source is also eliminated. The simplification of optical configuration would allow significant saving in expense and part count.

Other objects and advantages will become apparent from the following detailed description when taken in conjunction with the drawings, in which:

DETAILED DESCRIPTION OF THE INVENTION

While the invention will be described in connection with certain preferred embodiments, there is no intent to limit it to those embodiments. On the contrary, the intent is to cover all alternatives, modifications and equivalents included within the spirit and scope of the invention as defined by the appended claims.

Figure 1:
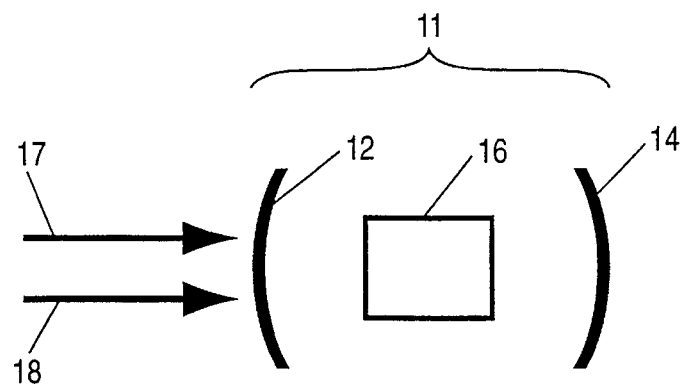
FIG. 1 is a schematic representation of an optical parametric oscillator known in the prior art.

Turning now to the drawings, FIG. 1 shows schematically an optical parametric oscillator (OPO) 11 in a configuration known in the prior art. The OPO 11 comprises a cavity defined by two mirrors 12 & 14, and a piece of nonlinear crystal 16. Both the pump wave 17 and the seeding wave 18 have to be injected into the cavity. The nonlinear crystal 16 converts the pump wave 17 into an idler wave and a signal wave. The OPO can be singly resonant or doubly resonant. In a singly resonant OPO, only the idler wave is reflected by the mirrors 12 & 14. In a doubly resonant OPO, both the pump wave and the idler waves are reflected, and only the signal is transmitted.

Figure 2:
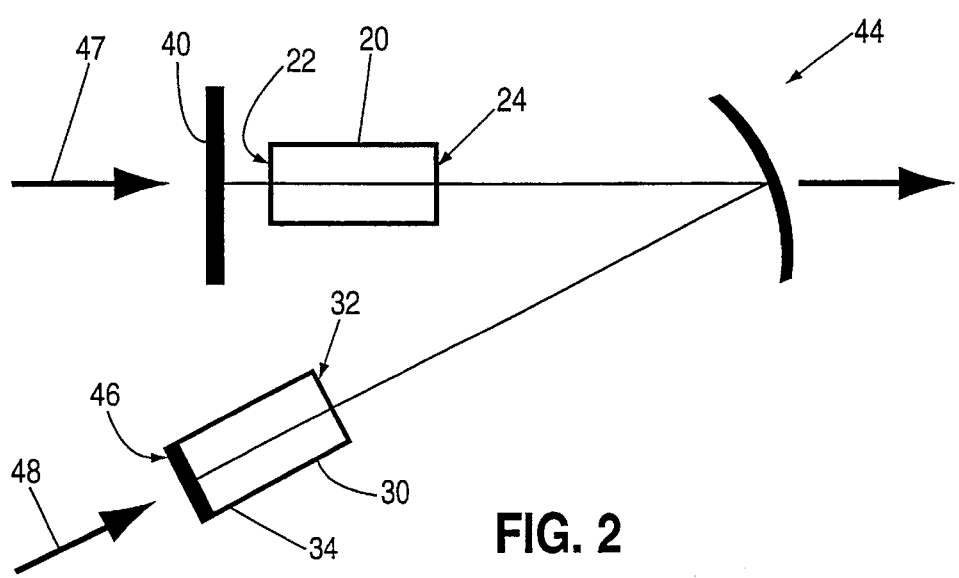
FIG. 2 is a schematic representation of an embodiment of a device according to the present invention, which comprises an optical parametric oscillator and a fixed-frequency seeding laser sharing the same cavity.

According to the present invention, an optical parametric oscillator is combined with a laser to share the same cavity. The laser wave generated in the cavity serves the function of a seeding wave. The frequency of the seeding wave is equal to that of one of two waves converted by the nonlinear material from the pump wave. FIG. 2 shows schematically an embodiment of such a laser/OPO (LOPO) combination. This particular embodiment is shown for the purpose of illustrating the general operating principle of a LOPO. The LOPO cavity in FIG. 2 is defined by two mirrors 40 & 46. Inside the LOPO cavity is illustratively a Nd:YAG crystal 30 which will lase at 1.064 um. The nonlinear material for converting the pump wave into waves of longer wavelengths is illustratively a KTP crystal 20. In this representative embodiment, the LOPO can be pulse-pumped with a Ti:sapphire, alexandrite, dye or Cr:LiCAF laser. The pump wave 47 as shown in FIG. 1 has a wavelength of 728 nm. For simplicity of illustration, the pump wave is shown to enter the KTP crystal at a 90° angle to its optical axis, i.e. the phase matching is 90° or non-critical. For an OPO alone (i.e. without a laser in the cavity), the output wavelengths of the KTP crystal 20 with non-critical phase matching can be calculated according to the equation presented in the article of Kato and Masutani, supra:

$$\lambda_s = -1.5646\lambda_p^4 + 3.7719\lambda_p^3 - 1.2079\lambda_p^2 - 0.8348\lambda_p + 1.2963$$

For a pump wavelength of 728 nm, this equation gives converted wavelengths at 1.064 um and 2.3 um. The converted wave wavelength of 1.064 um is the same as the wavelength of the intracavity laser field generated by the Nd:YAG crystal 30. This converted wave is the idler wave, and the converted wave at 2.3 um is the signal wave.

For this specific setup, the optical components of the cavity are coated to facilitate operation at 1.064 um corresponding to the wavelength of the Nd:YAG laser. The pulsed pump beam 47 passes through the mirror 40 adjacent to the KTP crystal 20, which is antireflection coated at 728 nm on its outer face 22. The term antireflection (AR) as used herein means that the reflectivity is typically less than 0.25%. The input mirror 40 is coated for high reflectivity (typically greater than 99.8%) at 2.3 um and 1.064 um and high transmission (typically greater than 90%) at 728 nm. The inner surface 24 of the KTP crystal 20 is AR coated for 2.3 um and 1.064 um, and high transmission at the 728 nm pump wavelength. The curved output coupler 44 is coated for a few percent transmission at 1.064 um and high transmission at 2.3 um. The radius of curvature of the output coupler 44 is such that the cavity is stable and the threshold of the KTP OPO is minimized. The other cavity mirror 46 is coated on the outer end 34 of the Nd:YAG rod 30. It is highly reflective at 1.064 um and highly transmitting at 0.809 um (the pump wavelength). The other end 32 of the Nd:YAG rod 30 is AR coated at 1.064 um. With the setup described above, the LOPO is singly resonant, in that only the idler wave at 1.064 um is reflected by mirrors 40 & 46 of the cavity.

In operation, the Nd:YAG rod 30 may be pumped with a broad area laser diode (not shown) of adequate power, such as 1 watt, using optics that are well known to those skilled in the art. The intracavity 1.064 um field produced by the diode-pumped Nd:YAG rod 30 could exceed 5 watts. Higher intracavity power may be achieved by modulating the pump to gain switch the Nd:YAG laser, i.e. operating the Nd:YAG laser in pulsed mode, or to drive it into regular spiked oscillation. When the laser is operated in pulsed mode, however, careful timing of the laser pulses relative to the pulses of the pump wave 47 is required.

The 1.064 um field serves the function of seeding the KTP crystal 20 for wavelength conversion. When the KTP 20 is pumped with a pulsed source, the circulating 1.064 um field will be amplified by the nonlinear gain of the LOPO and efficient conversion of the pump energy will accomplished. Because the LOPO field would build up from the intense intracavity field of the laser, instead of from noise, the threshold of the LOPO for pulsed pump operation would be very close to that for a CW-pumped OPO. Efficient pump depletion would also occur early in the pulse, leading to efficient operation of the relative low pump energies. Because efficient operation is possible at reduced pump intensities, this technique of combining the seeding laser with the OPO could make it possible to use nonlinear crystals that would have been damaged in pulse-pumped OPO's in the prior art.

The above illustration shows the generation of 2.3 um wave from the 728 nm pump wave, with non-critical phase-matching. If a different output wavelength from the LOPO is required, the pump energy has to be changed. This is because the frequency of the seeding wave generated by the Nd:YAG laser in the cavity is fixed in this case. In order to have effective seeding for the nonlinear material, the frequency of one of the two waves generated by the nonlinear material has to be fixed at the seeding frequency. As described above, the relation between the pump frequency $\omega_1$ and the frequencies of the two converted waves, $\omega_2$ and $\omega_3$, is $\omega_1=\omega_2+\omega_3$. If, for example, $\omega_2$ is fixed at the seeding frequency, changing $\omega_3$ requires equal change in $\omega_1$. If a tunable output is desired from the LOPO shown in FIG. 2, it must be pumped with a tunable source. Candidates for tunable sources include dye lasers, tunable solid state lasers, color center lasers, or other OPO's, etc. The LOPO technology is particularly well-suited to tunable flashlamp or diode-laser pumped solid state lasers as pump sources. In particular, gain switched Ti:sapphire or Q-switched, alexandrite, Cr:LiSAF and Cr:LiCAF lasers are currently preferred pump sources for a tunable LOPO.

Besides the changing the pump energy, the phase-matching conditions also need to be tuned in order to obtain tunable output from the LOPO in FIG. 2. This is in contrast to conventional OPO's the output of which can be tuned by varying either the pump wavelength or the phase matching conditions.

Figure 3:
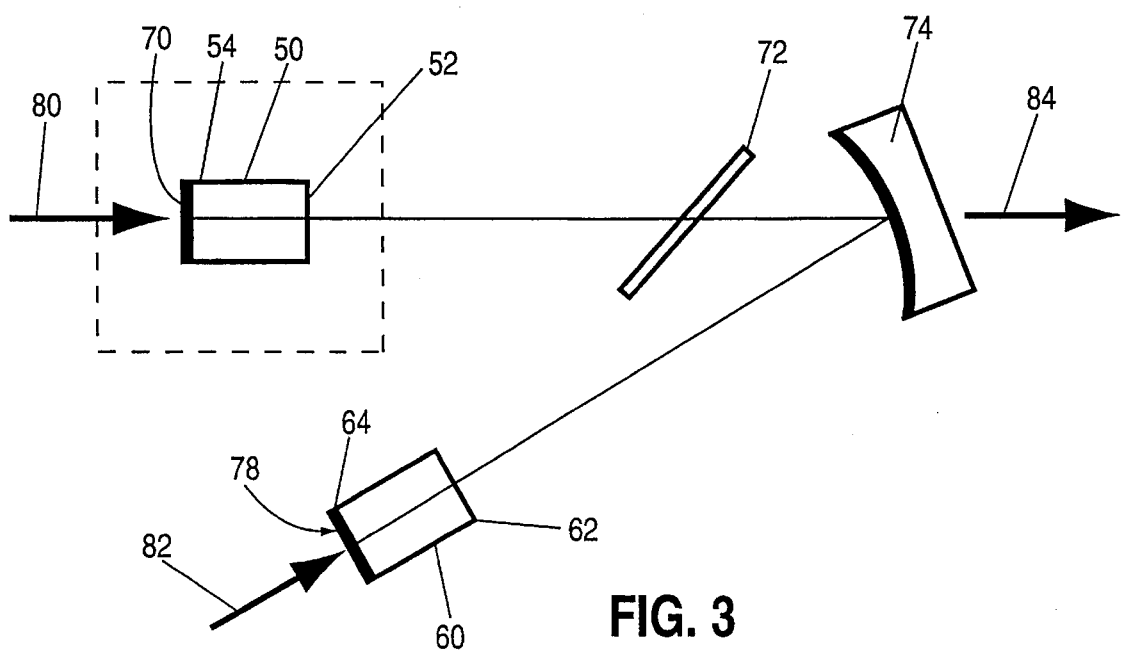
FIG. 3 is a schematic presentation of an embodiment of a device according to the present invention, which comprises an optical parametria oscillator and a tunable seeding laser sharing the same cavity.

A second LOPO system according to the present invention is shown in FIG. 3. In this representative embodiment, the seeding laser is tunable, in contrast to the fixed-frequency seeding laser of the LOPO illustrated in FIG. 2. The intracavity seeding field for the LOPO in FIG. 3 may illustratively be generated by a Cr:LiSAF crystal 60 which can be pumped by a diode laser (not shown). The Cr:LiSAF laser has a usable gain bandwidth from 780 nm to beyond 1000 nm. The nonlinear optical material in FIG. 3 may, for example, be a MgO doped LiNbO$_3$ crystal 50. In this example, the nonlinear crystal 50 is pumped by a pump source at 532 nm wavelength, which can be obtained by frequency doubling the output of a Nd:YAG laser. In the preferred embodiment the Cr-doping of the LiSAF crystal 60 is 2%. While this concentration is thought to be optimal for diode-pumped operation, Cr concentration ranging from 0.5% to 100% can be used. The LiSAF laser is pumped by a commercially available 670 nm diode laser (not shown). The power of the diode pump laser may be between 50 mW and 2 W, depending on cavity losses and the size of the intracavity mode in the Cr:LiSAF crystal 60.

The LOPO cavity in FIG. 3 is defined by the mirrors 70 & 78. The first mirror 70, which is also the input mirror for the input wave 80, is coated on the polished flat outer surface of the LiNbO$_3$ crystal 50. The second cavity mirror 78, through which the pump wave 82 for the Cr:LiSAF crystal 60 enters, is coated on the polished flat outer surface of the Cr:LiSAF crystal 60. The coatings on the LOPO cavity is FIG. 3 are chosen to facilitate operation with the seeding wavelength between 800 nm and 860 nm. The mirror 70 on the LiNbO$_3$ crystal 50 is coated for high reflectivity (typically greater than 99.8%) between 800 nm and 860 nm and high transmission (typically greater than 90%) at the 532 nm pump wavelength. The inner surface 52 of the LiNbO$_3$ crystal 50 is also polished flat and AR-coated (<0.25% reflectivity) for wavelengths between 800 nm and 860 nm. The mirror 78 on the Cr:LiSAF crystal 60 is coated for high reflectivity between 800 nm and 860 nm and high transmission at the 670 nm wavelength of the diode pump laser. The inside surface 62 of the LiSAF crystal 60 is also flat and coated for high transmission between 800 nm and 860 nm.

In operation, the output wavelength of the LOPO in FIG. 3 can be tuned over a wide range as the seeding wavelength is changed. The input wave 80 is converted by the LiNbO$_3$ crystal 50 to an idler wave the wavelength of which is substantially identical to the seeding laser wavelength in the cavity, and a signal wave which forms the output wave 84 from the LOPO. The frequency of the signal wave is the difference between the frequency of the input wave 80 and that of the idler wave. With the seeding wavelength tunable in the range of 800–860 nm, an output wavelength between 1390 nm and 1588 nm can be obtained.

The exact wavelength of operation is selected by simultaneously changing the temperature of the LiNbO$_3$ crystal 50 and rotating a birefringent filter plate 72. The frequency of the seeding wave is tuned by the birefringent filter 72 which is of the Lyot type commonly used in commercial tunable dye lasers. The birefringent filter is positioned at Brewster's angle for the seeding wave in the cavity to minimize reflections in the polarization direction corresponding to the highest gain in the Cr:LiSAF crystal 60. The temperature of the MgO:LiNbO$_3$ crystal 50 is adjusted to phase-match optical parametric oscillation so that the idler wavelength matches that of the seeding wave. The signal wave transmits through the curved output mirror 74 and forms the output wave 84 of the LOPO. The output mirror 74 is coated for high reflectivity from 800 nm to 860 nm and high transmission for output wavelengths between 1390 nm and 1590 nm. The radius of curvature of the output mirror 74 will typically lie between 1 cm and 50 cm, depending on the desired size of the LOPO resonator and pump spot size considerations.

The embodiments in FIGS. 2 & 3 are shown for illustrative purposes. The present invention is not limited to the specific configurations and types of components of those embodiments. The present invention is directed to the combination of a laser and an OPO in a single optical cavity for improved operational characteristics of the OPO. Any combination and configuration within the scope of the claims would be covered.

It should now be appreciated that what is provided is a technique for reducing the threshold and improving the conversion efficiency of an optical parametric oscillator pumped with a pulsed source. According to the invention, a laser is combined with an optical parametric oscillator to share the same optical cavity. The intense circulating field in the optical cavity generated by the laser provides the seeding field for the OPO, which reduces the threshold pump requirement and enhances the conversion efficiency.

What is claimed is:

1. An apparatus for generating coherent radiation by converting an input wave via optical parametric oscillation, comprising the combination of: a laser having an optical cavity for circulating a seeding wave and an idler wave; a gain medium positioned within the optical cavity for generating the seeding wave; and a quantity of nonlinear optical material positioned in the laser optical cavity for converting the input wave into a signal wave and the idler wave, the idler wave having a frequency substantially coinciding with a frequency of the seeding wave, the optical cavity circulating both the seeding and idler waves such that their modes are substantially automatically matched.

2. An apparatus as in claim 1, wherein the input wave is pulsed.

3. An apparatus as in claim 1, wherein the laser is pumped by diode laser.

4. An apparatus as in claim 1, wherein the laser operates in a continuous wave mode.

5. An apparatus as in claim 1, wherein the laser operates in a pulsed mode.

6. An apparatus as in claim 1, wherein the laser frequency is fixed.

7. An apparatus as in claim 6, wherein the laser material is Nd:YAG.

8. An apparatus as in claim 1, wherein the frequency of the laser is tunable.

9. An apparatus as in claim 8, wherein the laser material is Cr:LiSAF.

10. A method for generating coherent radiation by converting an input wave via optical parametric oscillation, comprising the steps of: pumping a laser having a laser cavity to generate a circulating laser wave in the laser cavity; admitting the input wave into the laser cavity; passing the input wave through a quantity of nonlinear optical material positioned in the circulating laser wave; tuning a phase-matching condition of the nonlinear optical material to convert the input wave into first and second waves, the first wave having a frequency substantially coinciding with the laser frequency; and removing a portion of the second wave from the cavity as the output, such that the modes of the first wave and the laser wave are substantially automatically matched.

11. A method as in claim 10, including the step of varying the frequency of the input wave, and repeating the step of tuning the phase matching condition of the nonlinear crystal, to vary the frequency of the second wave.

12. A method as in claim 10, including the step of varying the frequency of the laser, and repeating the step of tuning the phase matching condition of the nonlinear crystal, to vary the frequency of the second wave.

* * * * *